Oct. 9, 1951 F. C. FILO ET AL 2,570,930

AUTOMATIC PHONOGRAPH SYSTEM

Filed March 8, 1947 4 Sheets-Sheet 1

INVENTOR.
FRANK C. FILO
ARTHUR P. MARCUS
BY
Morton S. Bachman

AUTOMATIC PHONOGRAPH SYSTEM

INVENTOR.
FRANK C. FILO
ARTHUR P. MARCUS.
BY
Morton S. Brockman

AUTOMATIC PHONOGRAPH SYSTEM

Filed March 8, 1947 4 Sheets-Sheet 3

INVENTOR.
FRANK C. FILO
ARTHUR P. MARCUS
BY
Morton S. Brockman

AUTOMATIC PHONOGRAPH SYSTEM

Filed March 8, 1947 4 Sheets-Sheet 4

INVENTOR.
FRANK C. FILO
ARTHUR P. MARCUS
BY
Morton S. Brockman

Patented Oct. 9, 1951

2,570,930

UNITED STATES PATENT OFFICE 2,570,930

AUTOMATIC PHONOGRAPH SYSTEM

Frank C. Filo, Cleveland, and Arthur Paul Marcus, Cleveland Heights, Ohio, assignors to The Markepp Co., Inc., Cleveland, Ohio Application March 8, 1947, Serial No. 733,313

3 Claims. (Cl. 177—353)

This invention relates to automatic phonographs and has special reference to coin operated automatic phonograph systems capable of selecting and reproducing, at a distance from the phonograph, any desired record from a repertoire which is limited only by the size of the machine.

Conducive to a better understanding of this invention, it may be well to point out that coin operated automatic phonograph systems having remote selector stations or wall boxes that are connected to the automatic phonograph by fewer wires than the number of selections that are possible to be made, are not unique in the art. There are now systems in operation in which two wires select as high as 24 numbers. Such systems use various step-up units, synchronous motors or electronic tubes. There are also systems that use no direct wired connection between the wall box and the phonograph, but employ special wireless transmitters and receivers to send out and pick up electrical impulses which operate the selecting mechanism in the phonograph. However, all these systems are complicated in structure, delicate in adjustment and require special technical knowledge for their maintenance.

Systems having direct wired connection between the selector box and phonograph for each possible selection are the most desirable and rugged from the standpoint of efficient operation and low maintenance cost. Such systems use an electro-magnetic selector in the phonograph for selecting each record. Each electro-magnetic selector is connected by a direct wire to a switch in the remote wall box. The various wires are gathered together for the sake of convenience in the form of a trunk cable which is laid between the phonograph and each wall box. The trunk cable usually forms a permanent part of the building in which the system is installed, and is often built into the counters, partitions or booths of restaurants, taverns or other places of entertainment where such devices are popular.

As can well be imagined, such automatic phonographs are expensive to build and also require periodic changes in the recordings offered, since the selections must be constantly kept up to date to meet the everchanging taste of the public. It has, therefore, become a trade practice for the manufacturers of such devices to lease and service the machines, instead of selling them outright. However, since the trunk cable forms so intimate a part of the building structure, it has become common practice for the lessee to pay outright for the cost of installing the trunk cable which thereafter becomes his property. The standard installation of an automatic phonograph having 24 selections requires a 30-wire trunk cable. This cable has 24 wires which go directly from the selector switches in the wall boxes to each of 24 electro-magnetic record selectors located in the phonograph proper. The other six wires are used for auxiliary switching circuits, power leads and decorative lighting circuits as is well known to those familiar with the art.

The coin operated automatic phonograph or so-called "juke box" has become a widespread institution in this country and a prolific money maker. Competition between manufacturers has become very keen and the lessees, not having any money invested in the phonographs proper, have been quick to change machines as more attractive models were offered.

The manufacturers, every alert to improving their models, quite logically reasoned that if a machine offering 24 selections was popular, one offering 48 selections ought to be twice as popular. However, it was soon found that, while the lessee was more than happy to substitute a machine offering 48 selections for one offering 24 selections, he baulked at installing the additional 30-wire trunk cable which the larger machine required. This was due, not only to the installation cost, but also to the fact that such trunk cables are usually concealed in the fixtures and walls and any change would involve re-decorating expenses in addition to the cable installation charges.

The primary object of this invention, therefore, is to provide a coin operated selective phonograph system of the type having a trunk cable providing direct wired connection between the remote wall boxes and each of the electro-magnetic record selectors in the phonograph, in which each wire of the trunk cable is used to provide direct wired connection between the wall boxes and two or more of the electro-magnetic selectors.

Another object is to provide a coin operated selective phonograph system of the type stated that will permit the same trunk cable to be used to operate an automatic selective phonograph having two or three times the number of selections offered by the phonograph originally installed.

These and other objects of the invention will become apparent from a reading of the following specification and claims, together with the accompanying drawings in which like parts are referred to and indicated by like reference characters and wherein:

The phonograph system is schematically illustrated in the accompanying drawings, and only the important elements are shown, since other obviously needed parts are well known to those familiar with the art; and are therefore omitted for the sake of simplicity and clearness, since they constitute no part of the invention.

Figures 1, 2:
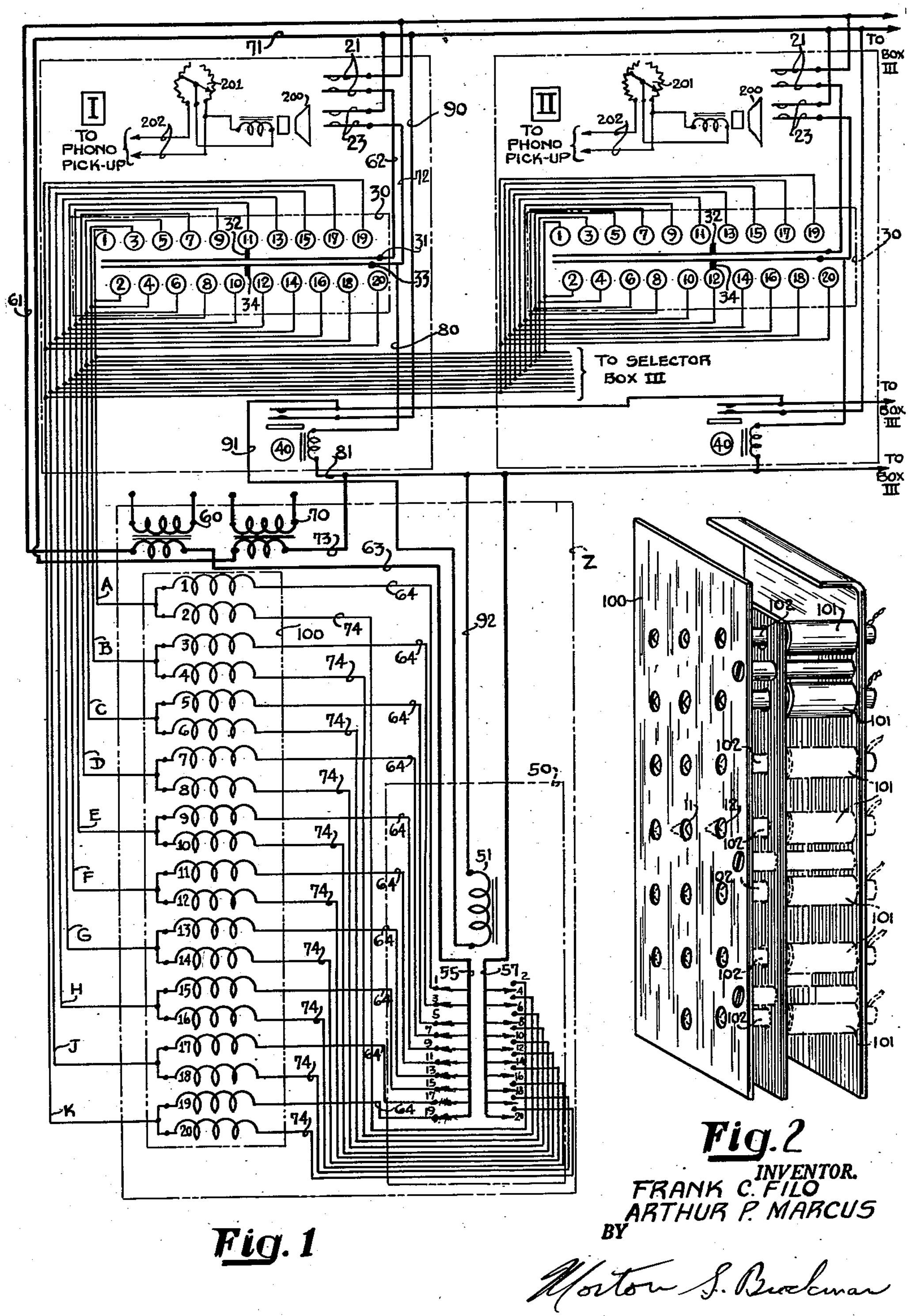
Figure 1 is a schematic portrayal of the electrical circuits used in a coin controlled phonograph system having two sets of electro-magnetic record selectors comprising ten selections in each set, made in accordance with this invention.
Figure 2 is a perspective view of a conventional bank of twenty record selector solenoids such as is used to operate a standard coin operated automatic selective phonograph having a repertoire of twenty records.
Figure 3:
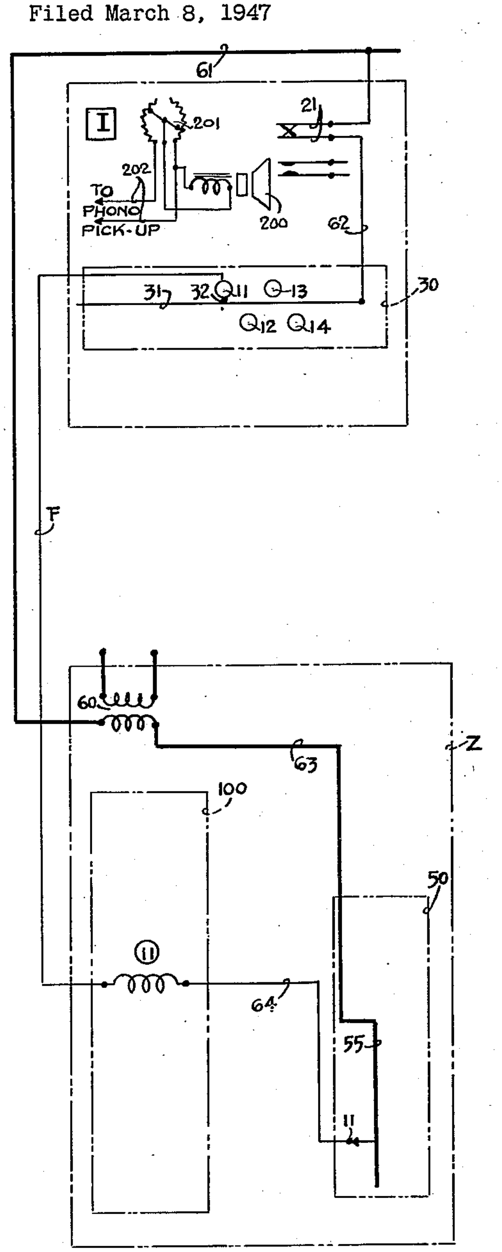
Figure 3 is a schematic wiring diagram showing only that portion of the first circuit in the Figure 1 that is energized in order to select record number 11 of the first set of records.

The preferred form of the invention illustrated in the Figure 1 has a phonograph cabinet Z connected to the remote stations or wall boxes I and II. In addition to the electric circuits shown, the cabinet Z contains an automatic record changer and player of the type that is actuated by electrically operated solenoid pins that impinge on a mechanical record selector that, in turn, selects a record from a repertoire of 20 records stored in the cabinet and places it on a turntable having the usual sound translator accessories.

Reference character 100 in the Figures 1, 2, 3 and 4 indicates a solenoid bank having 20 solenoids 101, or one for each record to be selected. The solenoids are of the conventional 25-volt type and each has a pin 102 which is normally retracted within the coil as shown. When a solenoid is energized, its pin 102 is forced out against the proper lever of the mechanical record selector which then proceeds to select and play the indicated record.

Reference character 50 in the Figures 1, 3, 4, 6, 7 and 9 indicates a master control or power switch having a row of contact points bearing odd numbered reference characters from 1 to 19 and a similar row of contact points bearing even numbered reference characters from 2 to 20, mounted on a dielectric base.

A square dielectric rod 54 is slidably mounted in the bearing blocks 59. A soft iron plunger is attached to the end of the dielectric rod 54 by means of a bushing 53, and is slidably mounted within the 25-volt solenoid coil 51. Two continuous metal strips 55 and 57, having flexible contact fingers 56 and 58 respectively, are mounted on the dielectric rod as shown in the Figures 7 and 9.

Figure 7:
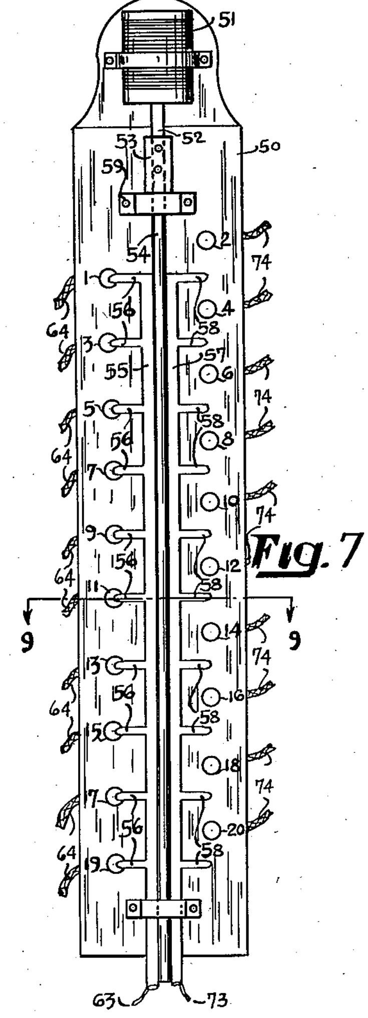
Figure 7 is a front elevation of the master selector shown in its normal position in which it forms a part of the first circuit.
Figure 9:
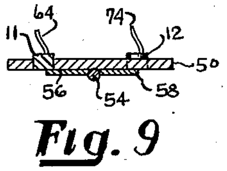
Figure 9 is a cross-sectional view taken along the line and in the direction of the arrows 9—9 of the Figure 7.

The master control switch is mounted in a vertical position so that the bushing 53 normally rests against the upper bearing block 59 and the contact fingers 56 are in contact with the odd numbered switch points, while the contact fingers 58 are positioned between the even numbered switch points as shown in the Figures 1, 7 and 9. When the solenoid coil 51 is energized, the plunger 52 is drawn up carrying the dielectric rod 54 with it and causing the contact fingers 56 to assume a position between the odd numbered switch points, while the contact fingers 58 are positioned on the even numbered switch points.

Reference character 30 indicates a dual multiple positioned selector switch having an upper row of odd numbered switch points and a lower row of even numbered switch points mounted on a dielectric block. The switch points of the lower row are positioned intermediate those of the upper row, as shown in the Figures 1, 3, 4 and 5. A bus bar 31 runs parallel to the upper row of switch points and a bus bar 33 runs parallel to the lower row of switch points. A dielectric rider 36 is slidably mounted between the two rows of switch points. A switch point contact arm 32, which is in sliding electrical engagement with the bus bar 31 and the odd numbered switch points, is mounted on the dielectric rider 36; and a similar switch point contact arm 34, which is in sliding electrical engagement with the bus bar 33 and the even numbered switch points, is mounted on the rider directly opposite the switch point contact arm 32. The arrangement of the arms and switch points is such that whenever contact arm 32 is in contact with a switch point of the odd numbered series, contact arm 34 is between two switch points of the even numbered series. The switch is operated by the selector knob 35 which is attached to the rider 36 through a belt and pulley arrangement as shown. The rotation of the knob 35 causes the belt 37 to carry the rider back and forth. The structure of the selector switch is disclosed in greater detail in the patent granted to us jointly on August 31, 1948, now abandoned, entitled "Selector Switch for Phonograph Circuit" and identified by Number 2,448,380. An improved form of the switch is also disclosed in detail in our co-pending patent application entitled "Selector Switch for Phonograph Circuit," Serial Number 40,078 filed by us on July 22, 1948.

Reference character 20 indicates a coin receiver of the conventional type having two circuit activating switches 21 and 23. The coin receiver has the usual tortuous passageways and magnets to detect and reject spurious coins. Approved coins strike against the switch arms 22 and 24, which travel downward as the coins pass, and momentarily close the switches 21 and 23 in succession.

Looking at Figure 1, it will be seen that the system is broadly divided into two parts, each having an entirely separate source of electric energy represented by the two 25-volt step-down transformers 60 and 70. The type and source of current is optional and could just as well be direct current supplied by storage batteries or dry cells. However, the sources must be entirely independent of each other. The first circuit includes the transformer 60 which is connected to the odd numbered switch points of the dual selector switch 30 through the coin operated activating switch 21, the trunk cables A, B, C, D, E, F, G, H, J and K, the odd numbered selector solenoids of the solenoid bank 100 and the odd numbered switch points of the master control switch 50. The second circuit includes the transformer 70 which is connected to the even numbered switch points of the dual selector switch 30 through the coin operated activating switch 23, the trunk cables A, B, C, D, E, F, G, H, J and K, the even numbered selector solenoids of the solenoid bank 100 and the even numbered switch points of the master control switch 50. In addition, there are third and fourth circuits connected in parallel with the second circuit which include the master control relay 40 and the master control switch solenoid 51 respectively.

It will be noted that the odd and even switch points of the selector switch 30 are paired together and share common trunk lines. The odd and even numbered selector solenoids are similarly paired. Switch points 1 and 2 and selector solenoids 1 and 2 being connected to trunk A; switch points 3 and 4 and selector solenoids 3 and 4 being connected to trunk B; switch points 5 and 6 and selector solenoids 5 and 6 being connected to trunk C; switch points 7 and 8 and selector solenoids 7 and 8 being connected to trunk D; switch points 9 and 10 and selector solenoids 9 and 10 being connected to trunk E; switch points 11 and 12 and selector solenoids 11 and 12 being connected to trunk F; switch points 13 and 14 and selector solenoids 13 and 14 being connected to trunk G; switch points 15 and 16 and selector solenoids 15 and 16 being connected to trunk H; switch points 17 and 18 and selector solenoids 17 and 18 being connected to trunk J and switch points 19 and 20 and selector solenoids 19 and 20 being connected to trunk K.

It will thus be seen that each trunk line in the cable connecting the wall boxes I and II with the automatic phonograph cabinet Z is capable of carrying an activating impulse to two solenoids and therefore can select two records. Instead of requiring 20 trunk lines, as was the case with prior art systems, the instant system only requires 10 trunk lines to make 20 selections. Each trunk line does the work of two.

Since conventional mechanical record changers require an action initiating solenoid for each record to be selected, and since the selector solenoids of this system are divided into two groups or series, each group being activated by a separate source of electric energy, it follows as a consequence that the instant repertoire of 20 records must be divided into two sets of 10 records each. The odd numbered records form one set and the even numbered records form another set. The odd numbered records being selected by means activated by the first source of electric energy 60 and the even numbered records being selected by means activated by the second source of electric energy 70.

Figure 1 shows the wall box I with its selector switch 30 engaged with the switch point 11 of the first circuit. In order to more easily explain the sequence of events that follows the deposition of a coin in the wall box I under this set of circumstances, only those circuits involved have been taken out of the Figure 1 and set up in the Figure 3.

The transformer 60 is connected to the switch 21 by means of the wire 61. The deposition of a coin closes the switch 21 and the wire 62 carries the current to the bus bar 31 of the selector switch 30. The switch arm 32 carries the current from the bus bar 31 to the switch point 11. From switch point 11 the current passes through the trunk F to the solenoid 11, then through the wire 64 to the switch point 11 of the master control switch 50. In the normal position of the master control switch, as heretofore explained, all the odd numbered switch point circuits are closed, therefore the current will pass into the contact strip 55 and then through the wire 63 and back to the transformer 60. The energized solenoid 11 will force its activating pin 11 out as shown in the Figure 2 and the mechanical record selector will select record 11. Solenoid 12 which is paired with solenoid 11 through the trunk F will not be energized since it forms a part of the circuit having transformer 70 as a source of electric energy, which circuit is broken at the master control relay 50 and at the selector switch 30 as indicated in the Figure 1 at wall box I.

Figure 4:
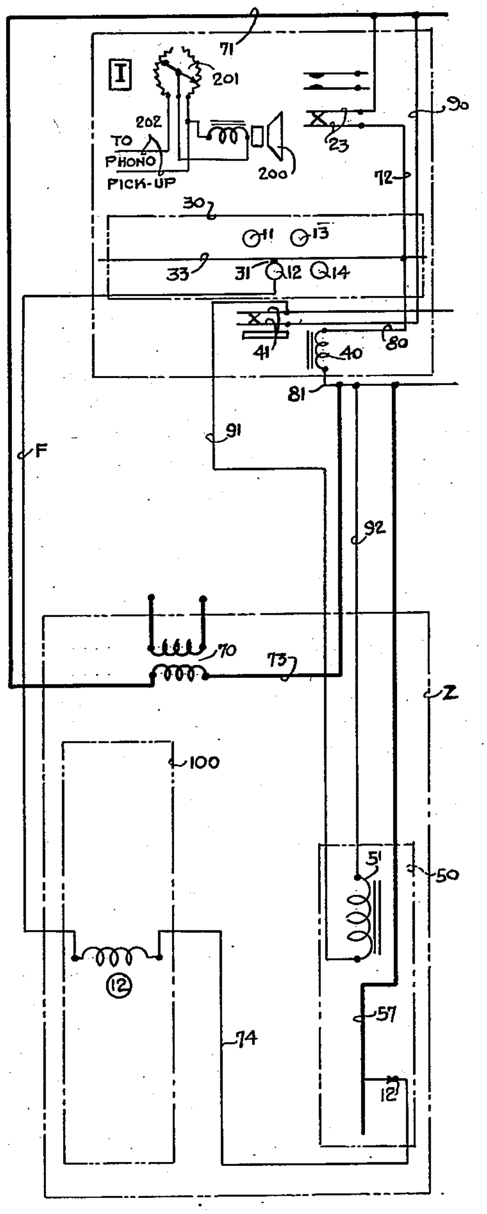
Figure 4 is a schematic wiring diagram showing only that portion of the second circuit in the Figure 1 that is energized in order to select record number 12 of the second set of records.
Figure 5:
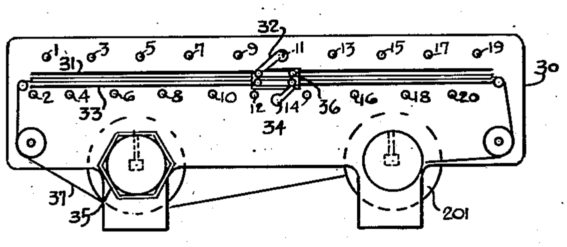
Figure 5 is a front view of the dual selector switch.
Figure 6:
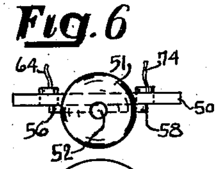
Figure 6 is a top view of the master selector.
Figure 8:
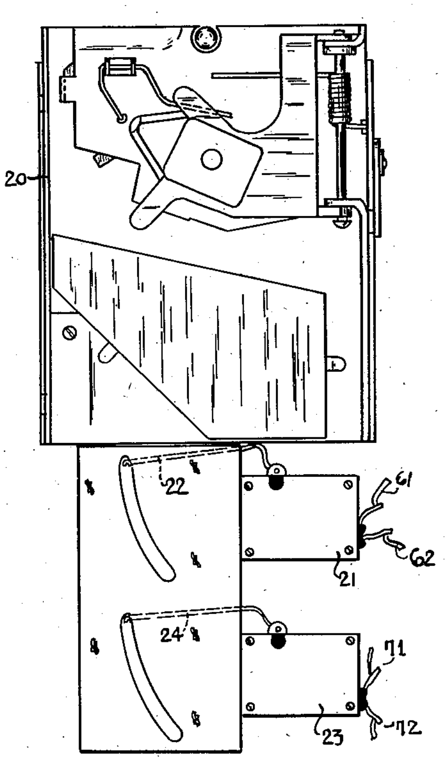
Figure 8 is a rear view of the coin operated controller switch.

To select record 12, the selector switch arm 34 is set on switch point 12 at shown in the Figure 4. Upon deposition of a coin, the switch 21 is closed but, since the switch arm 32 as indicated in wall box II of Figure 1 is between switch points 11 and 13, the first circuit is broken at this point and nothing happens. The falling coin then closes switch 23. Current then passes from the transformer 70 through wire 71, switch 23, wire 72, bus bar 33, switch arm 34, switch point 12 and through trunk F to selector solenoid 12. At the same time, a part of the current has passed through wire 80 to energize the master control relay 40 and back to the transformer 70 over wires 81 and 73. The action of the relay closes the relay contacts 41 and current passes from the wire 71, through wire 90, through the relay contacts 41, through wire 91 to the master control solenoid 51 and back to the transformer 70 through wires 92 and 73. The energized solenoid 51 pulls the master control dielectric bar 54 up, which in turn breaks all contact between the odd numbered switch points and the contact fingers 56 of the first circuit and establishes contact between all the even numbered switch points and the contact fingers 58. This completes the second circuit from the selector solenoid 12 through wire 74, through contact strip 57 and through wire 73 to transformer 70. The energized selector solenoid 12 ejects its pin 12 as shown in the Figure 2, causing the mechanical selector to select record 12. The switch 23 is opened after each coin passes by and the master control relay 40 and the master control switch 50 return to their normal positions.

The music is distributed through loudspeakers 200 located in the individual wall boxes and connected to the sound translating system through wires 202. The volume of the sound is regulated by a conventional volume control 201 which may be mounted, for the sake of convenience, on the frame of the selector switch 30 as shown in the Figure 5.

As shown in the Figure 1, the phonograph can be operated from any number of wall boxes which are connected in parallel through an elongation of the various trunk cables and accessory circuits.

The system just disclosed provides for the direct wired selection of two records by the use of only one trunk wire. A modified form of the invention is shown in the Figure 10, in which one trunk wire is used for the direct wired selection of three records. In this system, the records are divided into three sets. There are three independent sources of electric energy 300, 400 and 500 which are connected to three coin operated activating switches 320, 420 and 520, which have extra contacts 321, 421 and 521 which, in turn, activate the master control switches 350, 450 and 550 through their solenoid coils 351, 451 and 551. The triple selector switch 130 has the same structure as the dual selector switch 30 used with the preferred form, except that it has three bus bars 301, 401 and 501 and three sets of switch points which are connected in series of three to the trunk lines A, B, C, D and E as shown. The switch points are arranged so that only one circuit can be completed for each setting of the switch.

Figure 10:
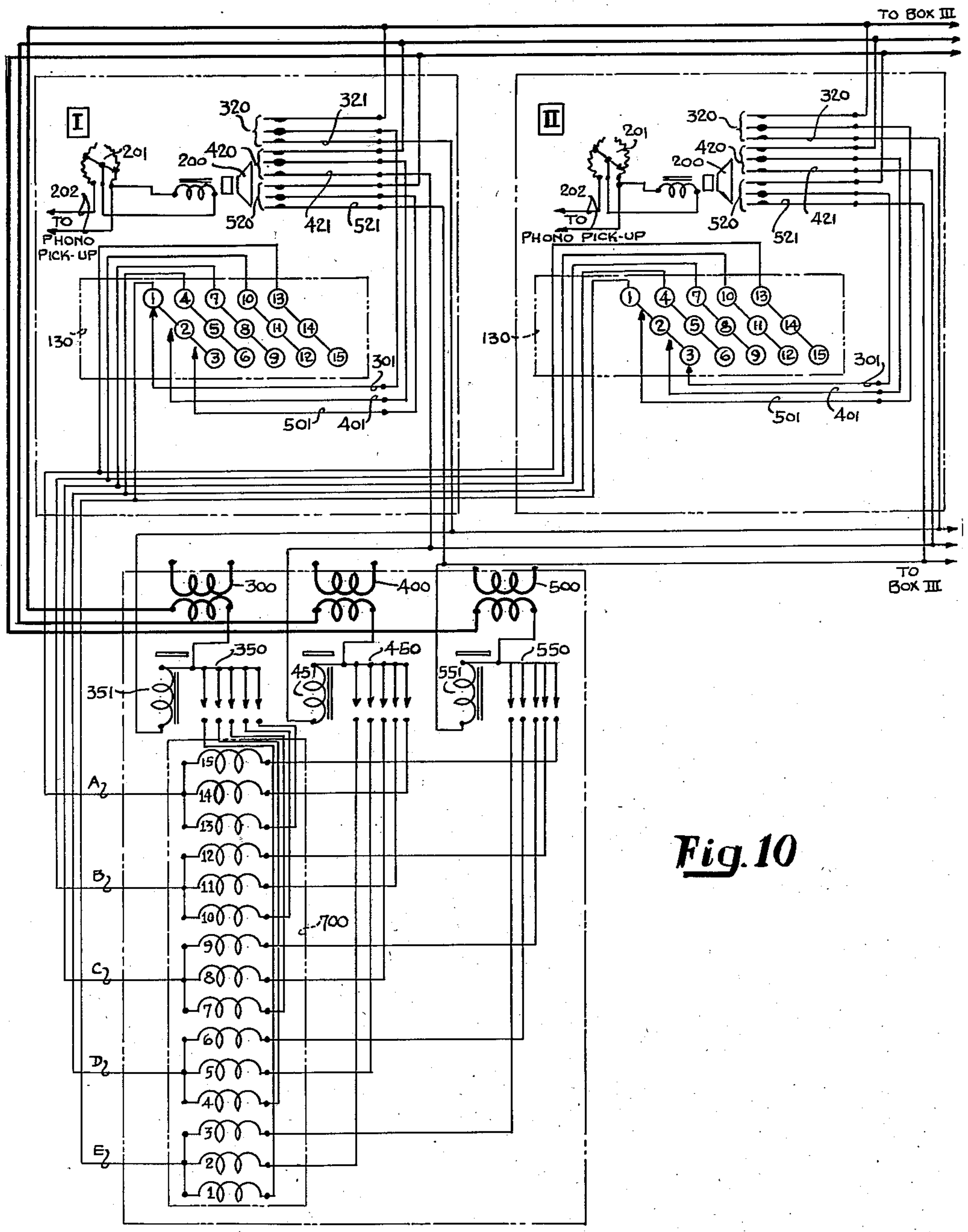
Figure 10 is a schematic wiring diagram of a modified form of coin controlled phonograph system, made in accordance with this invention, having three sets of electro-magnetic record selectors comprising five selectors in each set.

The selector solenoid bank 700 has its solenoids arranged in three series or sets. The position of each master control switch is normally open. Wall box I of Figure 10 shows the selector switch positioned to select record number 1. The deposition of a coin activates the circuit served by transformer 300 by closing the coin switch 320. Current passes through bus bar 301, through switch point 1, through trunk E, to selector solenoid 1. At the same time, contact 321 of switch 320 is closed and current passes through the master control switch solenoid 351 which causes the contacts of the master selector switch 350 to close. The current then completes its circuit from the selector solenoid 1 through the master control switch contacts and back to the transformer 300. The continued travel of the coin closes switches 420 and 520 which, in turn, activate master control switches 450 and 550; but since the circuits energized by transformers 400 and 500 are broken at the triple selector switch 130, the selectors 2 and 3 which are also connected to trunk E are not actuated. By successively positioning the contact arms of selector switch 130 on switch points 2 and 3, records 2 and 3 can be similarly selected and played in turn. Thus a trunk cable that was originally intended to be used with a conventional direct wired phonograph system, can be used with a machine offering three times the selections of the original machine by the use of this invention.

It will now be clear that there is provided a coin operated automatic phonograph system that is rugged and fool-proof in operation, since it employs direct wired connection between the selector switch in the remote wall boxes and the record selecting mechanism in the music box, and at the same time permits this to be done with only ½ to ⅓ the trunk lines needed by prior art direct wired systems. The herein described circuit is also adaptable for use in controlling phonograph apparatus such as is described in our co-pending application filed on September 5, 1946, now abandoned, entitled "A Phonograph Apparatus" and further identified by Serial No. 694,978.

While the invention has been disclosed in a preferred and modified form, it is to be understood that the specific embodiment thereof as described and illustrated herein is not to be considered in a limited sense as there may be other forms or modifications of the invention which should also be construed to come within the scope of the appended claims.

We claim:

1. In combination with a phonograph selector mechanism, a record selector circuit, comprising a first source of electric power; a first circuit connected thereto and including a first coin operated circuit activating switch, a multiple positioned selector switch, a normally open power switch, and a first series of electro-magnetic record selectors; a second source of electric power; a second circuit connected thereto and including a second coin operated circuit activating switch, a multiple positioned selector switch, a normally open power switch and a second series of electro-magnetic record selectors; a third source of electric power; a third circuit connected thereto and including a third coin operated circuit activating switch, a multiple positioned selector switch, a normally open power switch and a third series of electro-magnetic record selectors; a common trunk network, alternately forming a part of the first, second or third circuit, to connect the first series of record selectors to the first selector switch, the second series of record selectors to the second selector switch; and the third series of record selectors to the third selector switch; a fourth circuit in parallel with the first circuit, activated by the first coin operated activating switch and including means for closing the first power switch, whereupon a record selector of the first series is activated by the first power source through the common trunk; a fifth circuit in parallel with the second circuit, activated by the second coin operated activating switch and including means for closing the second power switch, whereupon a record selector of the second series is activated by the second power source through the common trunk; and a sixth circuit in parallel with the third circuit, activated by the third coin operated activating switch and including means for closing the third power switch, whereupon a record selector of the third series is activated by the third power source through the common trunk.

2. In combination with a phonograph selector mechanism, a record selector circuit, comprising, a first source of electric power; a first circuit connected thereto and including a first coin operated circuit activating switch, a multiple positioned selector switch, a normally open power switch and a first series of electro-magnetic record selectors; a second source of electric power; a second circuit connected thereto and including a second coin operated circuit activating switch, a multiple positioned selector switch, a normally open power switch and a second series of electro-magnetic record selectors; a third source of electric power; a third circuit connected thereto and including a third coin operated circuit activating switch, a multiple positioned selector switch, a normally open power switch, and a third series of electro-magnetic record selectors; the several coin operated activating switches being vertically aligned for sequential operation by a single coin, a common trunk network, alternately forming a part of the first, second or third circuit, to connect the first series of record selectors to the first selector switch, the second series of record selectors to the second selector switch, and the third series of record selectors to the third selector switch; a fourth circuit in parallel with the first circuit, activated by the first coin operated activating switch and including means for closing the first power switch, whereupon a record selector of the first series is activated by the first power source through the common trunk; a fifth circuit in parallel with the second circuit, activated by the second coin operated activating switch and including means for closing the second power switch, whereupon a record selector of the second series is activated by the second power source through the common trunk; and a sixth circuit in parallel with the third circuit, activated by the third coin operated activating switch and including means for closing the third power switch, whereupon a record selector of the third series is activated by the third power source through the common trunk.

3. A record selector circuit of the type defined in claim number 2 wherein the selector switches are combined in a single triple selector switch having three sections, the first section of which is in selective electrical engagement with the electro-magnetic record selectors of the first circuit, the second section of which is in selective electrical engagement with the electro-magnetic record selectors of the second circuit, and the third section of which is in selective electrical engagement with the electro-magnetic record selectors of the third circuit.

FRANK C. FILO.
ARTHUR PAUL MARCUS.

REFERENCES CITED

The following references are of record in the file of this patent:

UNITED STATES PATENTS

| Number | Name | Date |
|---|---|---|
| 570,967 | Stamm | Nov. 10, 1896 |
| 1,331,151 | Hopkins | Feb. 17, 1920 |
| 2,319,788 | Bryan et al. | May 25, 1943 |
| 2,347,995 | Dettle | May 2, 1944 |
| 2,425,974 | Winkler | Aug. 19, 1947 |

FOREIGN PATENTS

| Number | Country | Date |
|---|---|---|
| 581,928 | Germany | July 20, 1933 |